Patented Mar. 11, 1952

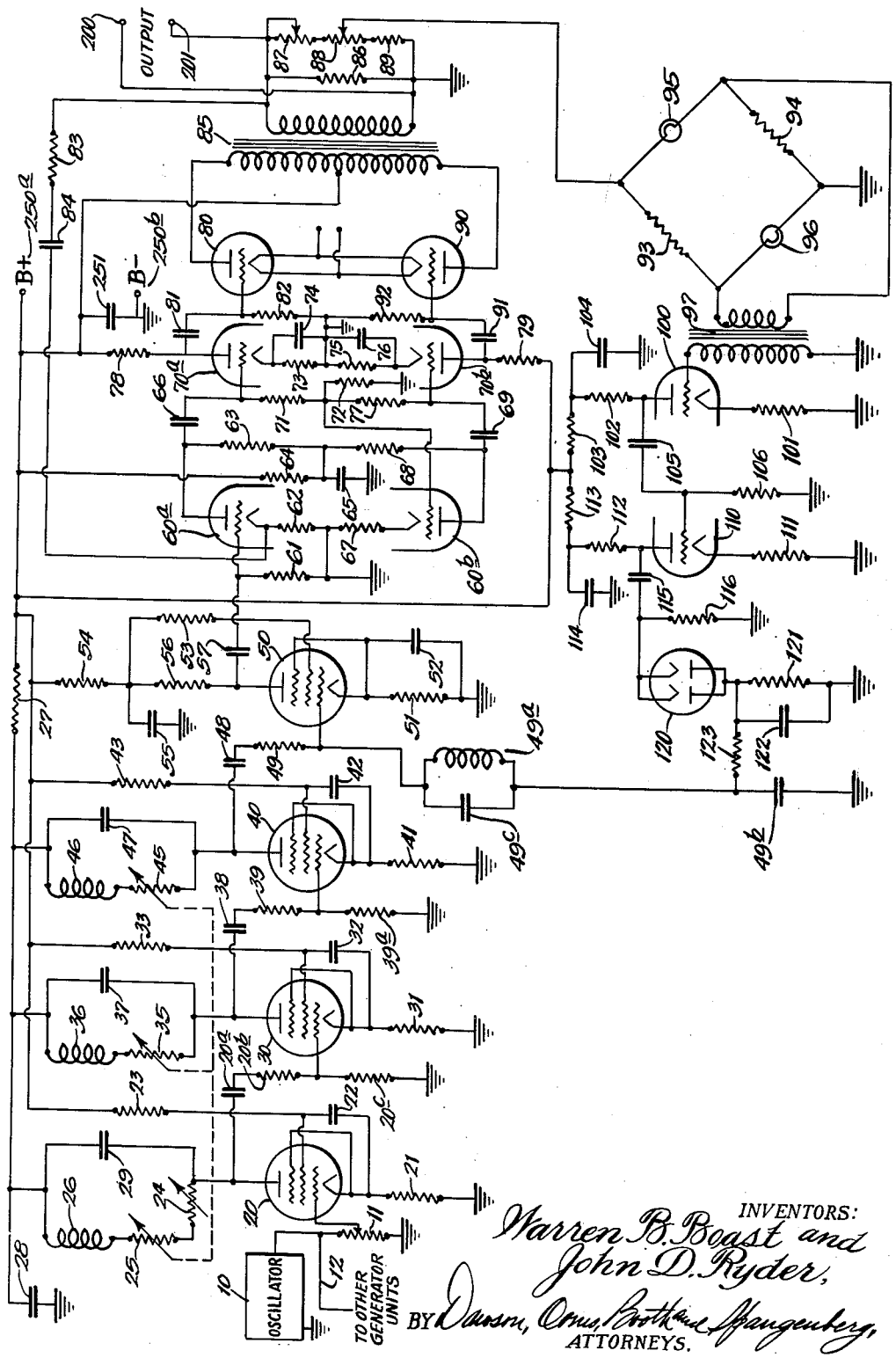

2,588,797

UNITED STATES PATENT OFFICE 2,588,797

GENERATOR

Warren B. Boast, Ames, Iowa, and John D. Ryder, Champaign, Ill., assignors to Iowa State College Research Foundation, Inc., Ames, Iowa, a corporation of Iowa Application March 4, 1950, Serial No. 147,621

2 Claims. (Cl. 323—119)

This invention relates broadly to electrical generators; in particular, it concerns apparatus adapted to serve as a standard source of alternating electromotive force at a predetermined frequency substantially higher than the frequencies ordinarily employed in electrical power work.

The immediate application for which our apparatus is particularly adapted is in the analysis of electrical networks. Such network analysis, frequently of critical importance in electrical engineering and research, often requires a power source, or standard signal source, wherein a given voltage can be applied to a network with the assurance that its amplitude and phase will not vary, notwithstanding changes in the nature of the load presented by the network.

Moreover, in network analysis the occasion frequently exists for two or more standard voltage sources the relative phase angles of which are subject to complete control by the analyst with the assurance that the phase angles established by his manual adjustments will be unaffected by changes which may occur in the load elements with which the voltage sources are associated.

Such voltage sources, with substantially zero source impedance and precise control of relative phase, could readily be obtained by prior-art methods where the operating frequency is of the order of a few hundred cycles per second or less. We have directed our attention, however, to the solution of the problem for generators operating at frequencies ranging from 5 to 100 or more kilocycles per second; in a particular practical embodiment to be described herein in detail, we employed a frequency of 10,000 cycles per second.

At such frequencies, prior-art methods of phase control and voltage regulation fail to give accurate and dependable results, and it was accordingly necessary for us, in solving the problem, to develop novel means for achieving extremely low source impedance and precise control of phase angle independently of the load circuit.

For the sake of simplicity, we have herein described in detail a structure of a particular generator unit; it will be understood that two or more of such units may normally be employed in a particular network analyzer, all of the units being driven by a single standard oscillator. Since the phase of the output voltage of each generator unit is subject to precise control by the analyst and is susceptible of continuous adjustment over more than 360° independently of the output voltage of other units in use, it will be apparent that the analyst has complete control over the relative phases of all the generator units employed in the analysis.

Accordingly, it may be stated that the primary object of our invention is to provide a single generator or voltage source at a relatively high alternating frequency wherein means are provided to give the operator precise manual control of the amplitude and phase of the output voltage, each of those variables being independent of the nature or impedance of the load, within exceedingly wide limits. In furtherance of the primary object, a subordinate object of our invention is to provide a controlled voltage source wherein continuous variation of the phase angle of the output voltage, relative to any arbitrary reference, can be accomplished by manually-operable adjustment means.

A further subordinate object of our invention is to provide, in combination with the phase-control apparatus just mentioned, a system of feedback which reduces substantially to zero the source impedance of the output voltage while having no effect whatever on its phase angle.

Other objects and advantages of our invention will appear as the specification proceeds.

The single figure of the appended drawing shows in schematic form a typical operating embodiment of the voltage generator made according to our invention. For simplicity's sake, only a single unit has been shown in the drawing although, as heretofore stated, a practical network analysis problem would frequently require the use of two or more similar units driven from a common standard oscillator.

The standard oscillator just mentioned may take any of several forms, according to the desired application. It may be directly crystal controlled; it may be indirectly crystal controlled, the output voltage from a higher-frequency crystal oscillator being used to control multivibrators for reducing the frequency to a submultiple, or it may be a self-controlled oscillator of any of the well-known types. In this specification it will be assumed that it is a source of voltage, preferably sinusoidal in wave form, having the desired frequency. Since it is not called upon to supply any appreciable quantity of energy, the nature of its internal impedance is not important. In the drawing, the standard oscillator is shown simply in block form and is denoted 10.

The output of oscillator 10 is connected to one terminal of a potentiometer 11, the other terminal of which is grounded. As has been previously mentioned herein, the standard oscillator 10 may also be used to drive other units as indicated by branch lead 12 on the drawing.

The variable arm of potentiometer 11 is connected to the control grid of tube 20. The cathode of tube 20 is connected through biasing resistor 21 to ground; the suppressor grid of tube 20 is connected to the cathode. The screen of tube 20 is by-passed to the cathode by capacitor 22 and is connected to the positive terminal 250a of a D.-C. voltage source through dropping resistor 23. The negative terminal 250b of the D.-C. voltage source is grounded. The plate of tube 20 is connected to the positive terminal 250a through a series circuit comprising variable resistor 24, variable resistor 25, inductor 26, and decoupling resistor 27. The junction of inductor 26 and decoupling resistor 27 is by-passed to ground by capacitor 28. Said junction point is also connected to the plate of tube 20 by capacitor 29. As will be more fully described hereinafter, the variable resistors 24 and 25 are employed in our invention as phase-angle control units, variable resistor 25 being mechanically coupled to variable resistors 35 and 45, to be mentioned hereinafter, so that a single knob or other manual control is effective to vary all three resistors over their entire range of variation. Variable resistor 24 is employed as a vernier device for making small phase changes. The network comprising elements 24, 25, 26, and 29 constitutes an impedance load device for the plate circuit of tube 20, and, to accomplish maximum shift of phase for given variation in the magnitudes of the resistors, capacitor 29 should present twice the reactance of inductor 26 to currents of the operating frequency.

The plate of tube 20 is connected to ground through series voltage divider network comprising coupling capacitor 20a, resistor 20b, and resistor 20c. The junction of resistors 20b and 20c is connected to the control grid of tube 30. Resistors 20a and 20b are chosen so as to impose on the grid of tube 30 substantially the same voltage that is applied to the grid of tube 20, thus reducing the effective gain of tube 20 to approximate unity. Also, the magnitudes of resistors 20b and 20c are large, in order to load only to a negligible extent the plate circuit of tube 20. In the practical embodiment illustrated, the value chosen for resistor 20b was two megohms while the value chosen for resistor 20c was one-half megohm.

The cathode of tube 30 is connected to ground through biasing resistor 31, and the suppressor grid is tied directly to the cathode. The screen grid of tube 30 is by-passed to the cathode by capacitor 32 and is connected to the positive terminal 250a by dropping resistor 33. The plate of tube 30 is connected to the junction of elements 27 and 28 by the series circuit comprising variable resistor 35 and inductor 36. Capacitor 37 is connected between the plate of tube 30 and the junction of elements 27 and 28. The network comprising elements 35, 36, and 37 is substantially similar to that comprising elements 25, 26, and 29, already described.

The plate of tube 30 is connected to ground through the voltage-divider network comprising, in series, coupling capacitor 38, resistor 39, and resistor 39a. The junction of resistors 39 and 39a is connected to the control grid of tube 40. Resistors 39 and 39a perform substantially the same functions as resistors 20b and 20c, already discussed, and they may be of equivalent magnitudes.

The cathode of tube 40 is connected to ground through biasing resistor 41, and the suppressor grid is connected directly to the cathode. The screen grid of tube 40 is connected to the cathode through by-pass capacitor 42, and is connected to the positive terminal 250a through dropping resistor 43. The plate of tube 40 is connected to the junction of elements 27 and 28 through variable resistor 45 and inductor 46 in series. Said junction point is also connected to the plate of tube 40 through capacitor 47. The network comprising elements 45, 46, and 47 may be incidental to the other two phase-control networks already described.

The plate of tube 40 is connected to ground through a rather involved network comprising, in series, coupling capacitor 48, resistor 49, inductor 49a, and capacitor 49b. Capacitor 49c is connected in shunt with inductor 49a, the two elements co-operating to form a parallel circuit resonant at the operating frequency. Resistor 49 may be of large magnitude like resistors 39 and 20b; two megohms is a suitable choice. The parallel circuit comprising elements 49a and 49c has very low impedance to currents of most frequencies but in the immediate neighborhood of the operating frequency its impedance is very high. The control grid of tube 50 is connected to the junction of elements 49 and 49a. Thus the coupling network which connects tube 40 to tube 50 loads onlly to a neglibigle extent the plate circuit of tube 40 and, in addition, functions as a very sharply-tuned filter which imposes on the grid of tube 50 a signal at the operating frequency, substantially stripped of harmonic components, as to all of which the parallel network 49a, 49c is a virtual short circuit.

The cathode of tube 50 is connected to ground through biasing resistor 51, shunted by by-pass capacitor 52. The suppressor grid of tube 50 is tied directly to the cathode. The screen grid of tube 50 is connected to positive terminal 250a through dropping resistor 53 and decoupling resistor 54. Screen resistor 53 is not by-passed, thus improving the remote cut-off action of tube 50. The junction of resistors 53 and 54 is by-passed to ground by capacitor 55. Plate load resistor 56 connects the junction of resistors 53 and 54 to the plate of tube 50. Tube 50 is connected by coupling capacitor 57 to the grid of tube 60a. Tubes 60a and 60b, which constitute a phase-splitting circuit, may be parts of a twin triode as indicated on the drawing. The grid of tube 60a is connected to ground through resistor 61, and the cathode of tube 60a is connected to ground through biasing resistor 62. The plate of tube 60a is connected to positive terminal 250a through load resistor 63 and decoupling resistor 64. The junction of resistors 63 and 64 is by-passed to ground by capacitor 65. The plate of tube 60a is connected to the grid of tube 70a by coupling capacitor 66. The grid of tube 70a is connected to ground through resistors 71 and 72. The junction of resistors 71 and 72 is connected to the grid of tube 60b. The cathode of tube 60b is connected to ground through biasing resistor 67. The plate of tube 60b is connected through load resistor 68 to the junction of resistors 63 and 64. A coupling capacitor 69 connects the plate of tube 60b to the grid of tube 70b.

The cathode of tube 70a is connected to ground through biasing resistor 73, shunted by by-pass capacitor 74. The cathode of tube 70b is connected to ground through biasing resistor 75, shunted by by-pass capacitor 76. The grid of tube 70b is connected to the junction of resistors 71 and 72 by resistor 77.

The voltage-divider network comprising elements 71, 72, and 77 is proportioned so as to apply to the grid of tube 60b an alternating voltage equal in magnitude and opposite in phase to that applied to the grid of tube 60a.

The plate of tube 70a is connected to positive terminal 250a by load resistor 78, and the plate of tube 70b is connected to positive terminal 250a by load resistor 79. A by-pass capacitor 251 is shunted across the terminals 250a and 250b of the D.-C. voltage source.

Tubes 70a and 70b may, if desired, be parts of a twin triode as indicated on the drawing.

Coupling capacitor 81 conects the plate of tube 70a to the grid of tube 80, the grid of tube 80 being connected to ground through resistor 82. The plate of tube 70b is connected to the grid of tube 90 through coupling capacitor 91, and the grid of tube 90 is connected to ground through resistor 92. The filaments of tubes 80 and 90 are heated by any suitable grounded low-voltage source (not shown). The plate of tube 80 is connected to one terminal of the primary coil of output transformer 85, the other terminal of said primary coil being connected to the plate of tube 90. The center tap of the primary coil of output transformer 85 is connected to positive terminal 250a. Tubes 80 and 90 should be power-amplifier tubes with low variational plate resistance. Type 2A3 is a suitable choice for these tubes.

One terminal of secondary winding of output transformer 85 is grounded. The other terminal is connected through resistor 83 and capacitor 84 to the cathode of tube 60a, thus functioning as a negative-feedback loop for the signal voltage developed across the secondary of transformer 85. Resistor 86 is shunted across the secondary winding of transformer 85, and in addition the variable resistor 87, potentiometer 88, and resistor 89 are connected in series across the secondary winding. Output terminals 200 and 201 are connected respectively to the opposite terminals of the secondary winding of transformer 85.

The variable arm of potentiometer 88 is connected to one corner of a bridge circuit comprising fixed resistors 93 and 94 and current-responsive variable resistors 95 and 96. Resistors 95 and 96 may be tungsten-filament lamp bulbs or other suitable resistors wherein the magnitude of resistance varies slowly as a function of the current passing through them. The bridge circuit is arranged with resistors 93 and 94 on opposite legs of the bridge, as shown. The arm of potentiometer 88 is connected to the junction of resistors 93 and 95, while the junction of resistors 94 and 96 is grounded. The junction of resistors 93 and 96 is connected to one terminal of the primary winding of transformer 97, while the junction of resistors 94 and 95 is connected to the other terminal of said primary winding. One terminal of the secondary winding of transformer 97 is grounded, while the other terminal is connected to the grid of tube 100. The cathode of tube 100 is connected to ground through biasing resistor 101. The plate of tube 100 is connected to positive terminal 250a through load resistor 102 and decoupling resistor 103 The junction of resistors 102 and 103 is by-passed to ground by capacitor 104.

The plate of tube 100 is connected to the grid of tube 110 by coupling capacitor 105, and the grid of tube 110 is connected to ground through resistor 106. The cathode of tube 110 is connected to ground through biasing resistor 111. The plate of tube 110 is connected to positive terminal 250a through load resistor 112 and decoupling resistor 113, the junction of resistors 112 and 113 being by-passed to ground by capacitor 114. The plate of tube 110 is coupled to the cathode of diode tube 120 by coupling capacitor 115. Resistor 116 is connected between the cathode of diode 120 and ground. The plate of diode tube 120 is connected to ground through resistor 121, shunted by by-pass capacitor 122. The plate of diode 120 is also connected through resistor 123 to the junction of elements 49a and 49b.

Resistor 123 and capacitors 122 and 49b function as a pi-network operative to filter the A.-C. component from the plate voltage of diode 120. The time constant of the network is many times the period of the signal current, and, as a result, the voltage present across capacitor 49b is a steady D.-C. voltage substantially free from all alternating components.

*Operation*

In the operation of our invention, the phase control is accomplished by variation of the manual knob or other member which simultaneously varies resistors 25, 35, and 45. Each of the three reactive circuits controlled by the respective variable resistors is capable, when working into a high-impedance load, of shifting the phase of the voltage across it by substantially more than 120°. In our novel circuit arrangement, each of the three reactive circuits "sees" exceedingly high load impedance, of the order of megohms, and each of the reactive networks thus operates independently of and free from any interaction with the other two networks. In consequence, when resistors 25, 35, and 45 are varied from zero to a high value, the phase of the plate voltage of tube 40 varies with respect to the voltage at the output of oscillator 10 by more than 360°. It is accordingly possible to establish any desired phase relation between the reference voltage at the output of oscillator 10 and the plate voltage of tube 40. When the inductive and capacitive elements 26, 36, 46 and 29, 37, 47 are proportioned so that the reactance of the respective capacitive elements is twice that of the corresponding inductive elements, no substantial change in amplitude of the alternating plate voltage of tube 40 occurs with changes in the position of the phase-shifting control. Any changes which do occur, however, either by reason of shifts in the phase control or from supply voltage variations and other factors, are eliminated by the limiting action of tube 50 and the network which couples tube 40 to tube 50. Moreover, the wave form of the voltage applied to the grid of tube 50 is maintained free of significant harmonic components by the sharp band-pass action of the parallel circuit 49a, 49c.

The voltage and power amplifier embracing tubes 60a, 60b, 70a, 70b, 80, and 90 is provided with signal negative feedback through the elements 83 and 84. Capacitor 84 functions solely as a blocking condenser, its capacitance being so large as to offer negligible impedance to signal-frequency currents in comparison with resistor 83. Therefore, no phase shift in the signal output voltage is occasioned by the signal feedback network.

The circuit which is principally responsible for accomplishing the reduction of the output source impedance to approximately zero is the feedback channel which comprises tubes 100, 110, and 120. That circuit, fed through the stabilizing bridge comprising elements 93—96, amplifies tremendously variations in the amplitude of the output voltage and reflects them as changes in D.-C. bias on the grid of tube 50. By this novel arrangement, tremendous sensitivity in feedback action is achieved and at the same time the phase angle of the output voltage is not to any degree affected by phase distortion in the amplifier comprising tubes 110 and 120. As a result, the phase angle of the output voltage set by the adjustment of resistors 25, 35, and 45 is faithfully carried through to the output terminals of the generator and is unaffected by the sensitive voltage-regulation circuit.

The results achieved in accuracy of phase determination and in voltage regulation by the illustrative embodiments herein described are startling. The effective source impedance "seen" looking in at the output terminals 200 and 201 is less than one-quarter ohm for a range of variation in load from zero to four times normal maximum. The phase-angle shift of the output voltage resulting from variations in the character of the load circuit is so small as to be undetectable on normal laboratory equipment, and it is wholly unaffected by variations in load current.

While we have in this specification described in detail a single illustrative embodiment of our invention, it will be understood that many variations may be made by persons skilled in the art without departing from the spirit of our invention.

We claim:

1. A signal generator comprising a source of substantially sinusoidal alternating voltage, a first electron tube having an anode and a control electrode, means connecting the signal source to the control electrode, a first reactive network in circuit with said anode, said network comprising a variable element operable to vary the phase angle thereof, a second electron tube having an anode and a control electrode, means connecting the first network to said second control electrode, a second reactive network in circuit with said second anode, said network comprising a variable element operable to vary the phase angle thereof, means mechanically linking said variable elements to permit their simultaneous manual adjustment over their range of variation, whereby the phase angle of the voltage across said second network with reference to the source voltage may be continuously varied over a range of 360°, an electron tube amplifier having input means and output means, circuit means connecting said second anode to said input means comprising a very high resistance serially connected therein, a feed-back amplifier connected across said output means, rectifier means coupled to said feed-back amplifier operative to derive therefrom a uni-directional voltage, and circuit means operative to apply said uni-directional voltage to said input means, said high-resistance element and said uni-directional voltage cooperating to vary the gain of said amplifier without affecting the load on said second anode and thereby maintaining the magnitude and phase angle of the signal voltage across said output means independent of the characteristics of any load device thereto connected.

2. Apparatus according to claim 1 wherein a high-Q parallel reactive circuit resonant at the signal frequency is connected across said input means.

WARREN B. BOAST.
JOHN D. RYDER.

REFERENCES CITED

The following references are of record in the file of this patent:

UNITED STATES PATENTS

| Number | Name | Date |
| --- | --- | --- |
| 2,244,695 | Hathaway | June 10, 1941 |
| 2,284,649 | Grabau | June 2, 1942 |
| 2,385,212 | Konrad | Sept. 18, 1945 |
| 2,451,796 | Berkoff | Oct. 19, 1948 |